United States Patent [19]

Babjak et al.

[11] Patent Number: 5,447,707
[45] Date of Patent: Sep. 5, 1995

[54] PROCESS FOR PRODUCING NICKEL HYDROXIDE

[75] Inventors: Juraj Babjak; Victor A. Ettel, both of Mississauga; Stephen J. Baksa, Etobicoke, all of Canada

[73] Assignee: Inco Limited, Toronto, Canada

[21] Appl. No.: 196,769

[22] Filed: Feb. 10, 1994

Related U.S. Application Data

[63] Continuation of Ser. No. 898,579, Jun. 15, 1992, abandoned.

[51] Int. Cl.$^6$ .................... C01B 13/00; C01G 53/00; C01C 1/00
[52] U.S. Cl. ..................................... 423/592; 423/352
[58] Field of Search .................. 423/592, 352, 395; 429/223

[56] References Cited

U.S. PATENT DOCUMENTS 3,657,013  4/1972  Melin ............................... 136/28
4,053,578  10/1975  Hill et al. ........................ 423/592

FOREIGN PATENT DOCUMENTS 0388808  9/1990  European Pat. Off. .
3513119  10/1986  Germany .

OTHER PUBLICATIONS

Baumgartner, C. E., "Rate of Porous Ni Plaque Corrosion in Ni(NO$_3$)$_2$ Solutions", J. Electrochem. Soc.: Electrochem. Sci. and Tech., Jan., 1988, 135(1), pp. 36–40.
U.S. Patent Application Ser. No. 590,431, filed Apr. 26, 1945, 639 O.G. 607 (1950) (Abstract only).

*Primary Examiner*—Steven Bos
*Attorney, Agent, or Firm*—Edward A. Steen

[57] ABSTRACT

A process for producing nickel hydroxide from nickel powders, in which the feed nickel powder is directly converted in an aqueous solution containing nitrate and particulate nickel at least at room temperature and a pH in excess of about 6 into nickel hydroxide of a high density. Nickel powders of high surface area, e.g. 0.4 m$^2$/g or higher, typically produced by the thermal decomposition of nickel carbonyl, are particularly suitable as feed materials for this process.

14 Claims, 3 Drawing Sheets

PROCESS FOR PRODUCING NICKEL HYDROXIDE

This is a continuation of copending application(s) Ser. No. 07/898,579 filed on Jun. 15, 1992, now abandoned.

TECHNICAL FIELD

The instant invention relates to the production of nickel hydroxide in general, and more particularly, to a process for directly producing nickel hydroxide from nickel powder.

BACKGROUND ART

Nickel hydroxide [Ni(OH)$_2$— also called nickelous hydroxide or divalent nickel hydroxide] is an important material in the manufacture of positive nickel-electrodes for alkaline batteries as well as for other industrial uses. Essentially all commercial processes for making nickel hydroxide are based exclusively on its caustic precipitation from nickel salt solutions (nickel sulfate, nickel chloride or nickel nitrate). Although at first blush these processes appear to be simple, in reality they involve a number of involved operating steps and produce environmentally unacceptable effluents. A direct conversion of nickel powder into nickel hydroxide by an aqueous oxygen oxidation was described in an earlier European patent application (90 104 985.8) having common ownership. The process options described in this application require either operating at elevated pressures or the necessity of employing high ammonia content aqueous solutions.

Standard commercial practice generally results in the nickel hydroxide being contaminated with measurable amounts of the cation of the alkaline hydroxide and the anion of the nickel salt. Even though the by-product of precipitation, e.g. sodium sulfate, is very soluble in water, washing of the gelatinous nickel hydroxide precipitate is very difficult. Furthermore, the gelatinous precipitate almost always gives a low tap density nickel hydroxide product directly upon drying. One of the objects of the present invention is to provide a dry nickel hydroxide product which has a high tap density as directly produced after drying. A second object of the present invention is to provide a nickel hydroxide which is more crystalline and relatively pure compared to nickel hydroxide commercially available heretofore. The first and second objects of the invention are accomplished by the third object of the invention which is to provide a low cost, efficient process for the manufacture of nickel hydroxide.

SUMMARY OF THE INVENTION

A process for directly producing nickel hydroxide from nickel powder in an aqueous solution containing nitrate and nickel ions. The pH of the solution is modulated by the addition of nitric acid. Nickel powders of high surface area, e.g. 0.4 m$^2$/g or higher, are particularly suitable as feed materials for this process.

PREFERRED EMBODIMENT OF THE INVENTION

Figure 1:
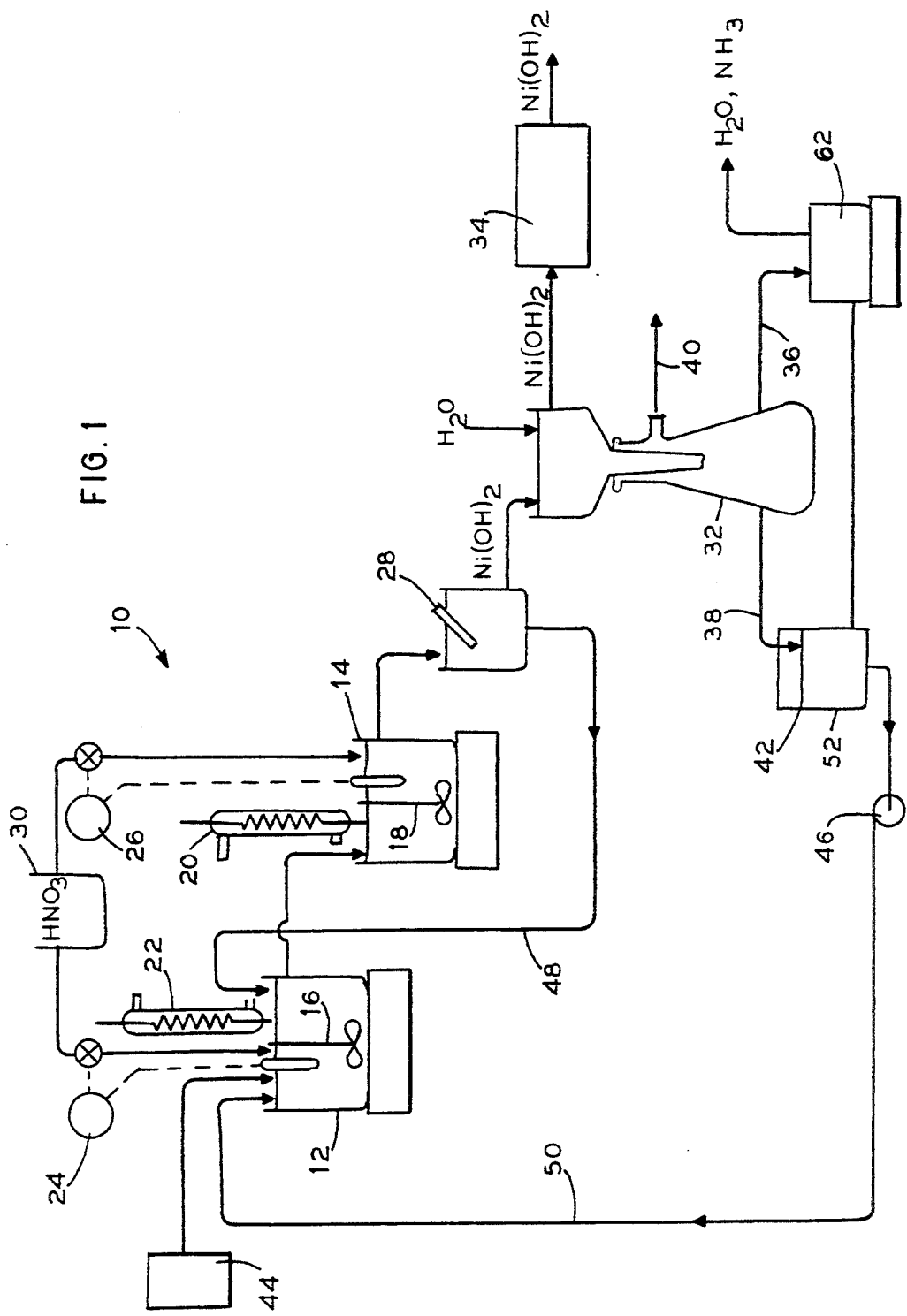
FIG. 1 is a schematic representation of an embodiment of the invention.

It has been determined that nickel powder can be converted directly into pure nickel hydroxide in an aqueous solution containing nickel, nitrate ions, and optionally ammonium and nitric acid. The instant invention may be represented in the following somewhat simplified overall reaction:

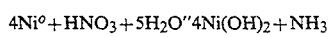

$$4Ni^\circ + HNO_3 + 5H_2O \rightarrow 4Ni(OH)_2 + NH_3$$

The above referenced reaction may be carried out at atmospheric pressure and at temperatures equal to and above ambient temperature. Generally, to accelerate the kinetics of the reactions the operating temperature most likely should be at least about 50° C. Experiments were also successfully carried out at 95° C., 70° C. and 60° C. using fine nickel metal powder such as produced by the thermal decomposition of nickel carbonyl—Ni(CO)$_4$. The conversion of an elemental nickel into nickel hydroxide, according to the process of this invention, does not require oxygen or a catalyst. One mole of nitric acid (HNO$_3$) which provides one mole of nitrate has a capacity to convert four moles of elemental nickel into four moles of nickel hydroxide, while generating one mole of ammonia (NH$_3$), which may be recovered from the vapor phase. Because neutralization with caustic is not required, the reagent cost is very low; difficult effluents containing neutralization by-products (e.g. NaNO$_3$) are not generated; and the hydroxide product is not contaminated with alkali metals. The process is capable of generating a dense nickel hydroxide of a high crystallinity for general uses, or a product with a high electrochemical activity, suitable, for example, in the manufacture of nickel-containing batteries.

As opposed to other systems, only small quantities of ammonia may be affirmatively added to the reaction since it is produced as a by-product. The ammonia which may be initially introduced as a pH control for the nitrate source apparently complexes with the nickel and accelerates the reaction. Any source of nitrate such as nitric acid, ammonium nitrate or nickel nitrate may be used. In some of the following examples, ammonium nitrate was utilized since it was available at hand. Nitric acid is also conveniently employed to modulate the pH of the solution and provide a nitrate source. However, the process is not so limited thereto. The nitrate (NO$_3^-$) in the solution acts as a reactant and is consumed as it oxidizes the nickel metal to the +2 state for the subsequent combination with the (OH)$^-$ conjugate base to form nickel hydroxide and ammonia.

The instant process is exquisitely simple. An additional feature of the instant invention is the ease of incorporating small quantities (from <1% to several %) of cobalt, cadmium, zinc, iron, lithium, barium or other cations into the crystal structure of nickel hydroxide. This is very important in the manufacture of battery grade nickel hydroxide with the appropriate electrochemical properties.

A number of experiments were run to demonstrate the efficacy of the instant process.

EXAMPLE 1

Batch tests were conducted at atmospheric pressure in a small reactor equipped with four baffles and a six blade radial turbine impeller. The reactor was charged with 1.8 liters of 1 molar ammonium nitrate (NH$_4$NO$_3$) solution, whose pH was adjusted with ammonia (NH$_3$) to between 6.0 and 9.0, and 270 grams of nickel powder (255 type—available from Inco Specialty Powder Products, Saddle Brook, N.J., USA). The mixture was heated to a reaction temperature of 95° C. and allowed to react at a constant pH (in the range of 6.0 to 9.0), maintained by the addition of 1:1 nitric acid (HNO$_3$), for 22–28.5 hours. Following the reaction the produced nickel hydroxide was filtered and the filter cake washed with water and then dried in an oven.

The analyses of dry nickel hydroxide products and filtrates are listed below:

Nickel Hydroxide:
  Elemental Ni: as low as 0.03%
  Total Ni: 59.5–63.5%
  Bulk Density: 0.88–1.29 g/cm$^3$, and
  Tapped Density: 1.59–1.93 g/cm$^3$
Filtrate:
  3–17 g/λ Ni
  18–28 g/λ total NH$_3$, and
  −63 g/λ NO$_3$

EXAMPLE 2

Referring to FIG. 1, there is shown a schematic flow diagram of a semicontinuous laboratory apparatus 10. The apparatus consists of two temperature controlled 2.8 liter reactors 12 and 14 in series. The reactors 12, 14 are each equipped with four baffles, a mixing impeller 16, 18, reflux condensers 20, 22, pH monitors 24, 26 and feed ports (not shown). A source of nickel powder 44 meters the appropriate quantity of nickel into the reactor 12. The pH monitors 24, 26 communicate with a nitric acid source 30 which feeds the requisite quantities of nitric acid into the reactors 12 and 14 to maintain the appropriate pH levels therein.

A magnetic separator 28 removes any remaining nickel powder and returns it via line 48 to the reactor 12. The nickel hydroxide slurry is washed with water and filtered in vacuum container 32. Line 40 represents a vacuum line.

Ni(OH)$_2$ filter cake is dried in an oven 34. This is the final product.

The wash liquor 36 is subjected to evaporation to maintain the water and ammonia balance. The concentrated wash liquor is combined with the filtrate 38 in container 42 to form a feed solution that is propelled by pump 46 via line 50 into the reactor 12.

For the apparatus 10, a feed solution 52, containing 1–3 moles/λ NH$_3$, 0.5–1.5 moles/λ NO$_3$, 0.2–0.5 mole/λ nickel, and balance water was pumped via pump 46 at a rate of 2 or 4 mλ/min. to the first reactor 12, where 19 grams of nickel powder from the source 44 were added every 30 minutes. The partially reacted slurry overflowing from the first reactor 12 continued to react in the second reactor 14. Both reactors 12, 14 were operated at 95° C. at atmospheric pressure and a pH of 8.5, maintained by the addition of 1:1 nitric acid from the source 30. The reacted nickel hydroxide slurry, overflowing from the second reactor 14, was subjected to magnetic separation 28 to remove any unreacted nickel powder, which was recycled to the first reactor 12 via line 48, and then to filtration and washing. The washed filter cake was dried in the oven 34. The filtrate 38, and the wash liquor 36, after some evaporation, were combined and recycled as the feed solution 52. The evaporation of the wash liquor 36 in vessel 62 is required to maintain the proper water and ammonia balance. This is very important in order to eliminate any liquid waste stream containing ammonium or nitrate ions.

Figure 2:
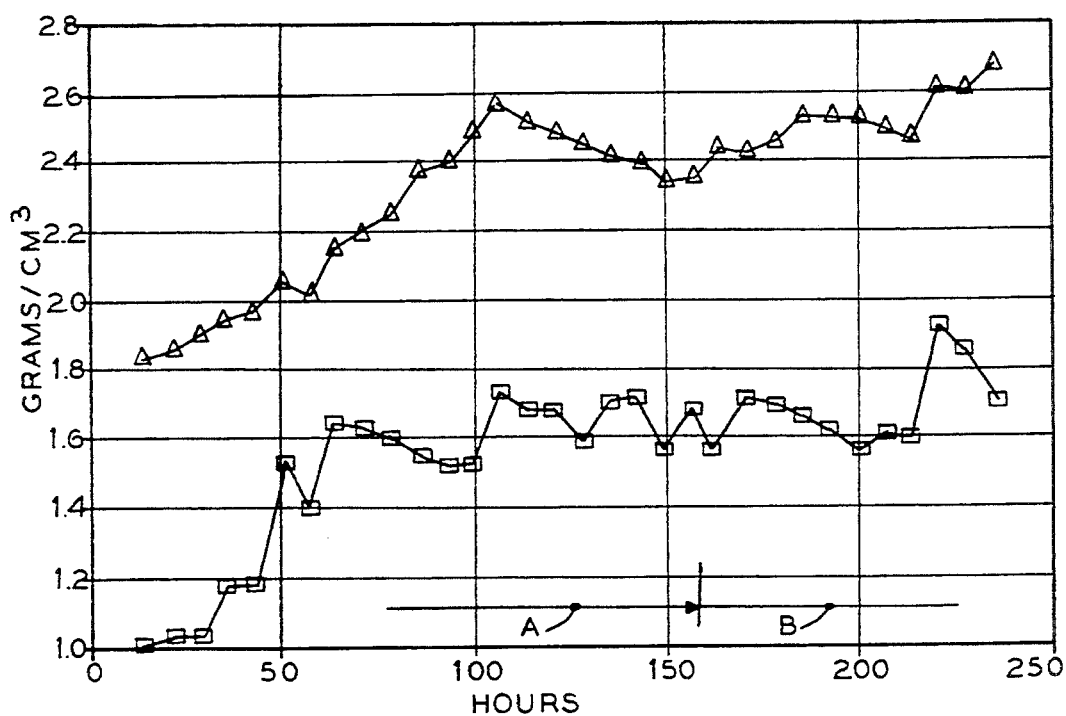
FIG. 2 is a graph plotting density of nickel hydroxide against time.

The produced nickel hydroxide was of a good purity and a high density. As shown in FIG. 2, the nickel hydroxide tapped density gradually increased and reached 2.5–2.7 g/cm$^3$ after operating for approximately 100 hours. The hydroxide particles were of a spherical shape with the average diameter of −7 micrometers. The Δ's represent the tapped density and the □'s represent the bulk density. Reference A represents the single reactor 12 and reference B represents the two reactors in 12, 14 in series.

EXAMPLES 3 TO 7

Additional tests were run using the apparatus 10 of FIG. 1 except that the reaction temperatures and the pH was varied as follows. The feed powder in these runs was a mixture of 99% nickel and 1% cobalt powders from the source 44. The purpose of the mixed powder feed was to incorporate small quantities of cobalt hydroxide into the crystal structure of the resultant nickel hydroxide.

Example 3: 70° C. and pH=8.5
Example 4: 60° C. and pH=8.5
Example 5: 60° C. and pH=9.0
Example 6: 50° C. and pH=8.5
Example 7: 50° C. and pH=9.0

Figure 3:
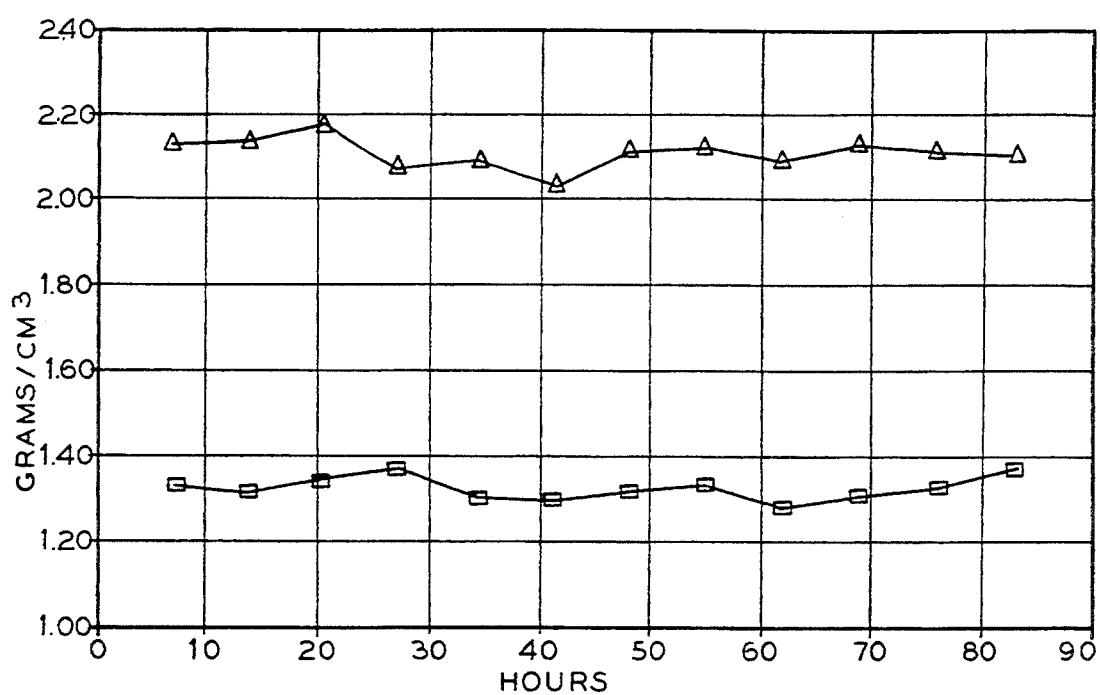
FIG. 3 is a graph plotting density of nickel hydroxide with cobalt against time.

The produced hydroxides analyzed about 60.5–61% nickel and 0.62–0.65% cobalt. The tapped density was typically between 2.00–2.20 grams/cm$^3$ and the bulk densities were about 1.3–1.4 grams/cm$^3$. The results for Example 7 are plotted in FIG. 3. The results for the other Examples exhibited similar plots and densities. The tapped density decreased only slightly by lowering the operating temperature from 70° C. to 50° C. —only by about 0.1 grams/cm$^3$.

EXAMPLE 8

The laboratory apparatus of Example 2 above was operated in a similar fashion at 50° C. and pH 9.0 or 9.5, except that in addition to cobalt, cadmium ions were also introduced into the process. However, in this case, cadmium was dissolved in the feed solution 52, in the form of its nitrate salt and thus introduced into the reaction system as Cd$^{++}$. It then co-precipitated with the nickel and cobalt during the nickel hydroxide synthesis. Depending on the rate of cadmium nitrate addition into the feed solution 52 the produced hydroxide analyzed up to 3.5% cadmium in this run. The incorporation of cadmium did not appear to affect the operation or the hydroxide density.

Without departing from the spirit of this invention the reaction can be carried out at any temperature from say room temperature (−20° C.) to the boiling temperature of the feed solution and a pH from as low as around 8.5 to as high as 10. Also, the concentration of nickel powder in the reactors 12, 14 can vary within a wide range, from say a few grams per liter to 30% by mass or higher. Generally the higher the operating temperature the higher is the reaction rate and the denser is the product. Also, the higher the operating pH the lower the entrainment of nitrate ions in the hydroxide. Although higher pressures may enhance reaction kinetics, there is no need to operate above atmospheric pressure.

By employing stoichiometric or even excess nickel vis-a-vis the nitric acid and removing the ammonia, nickel nitrate production is depressed so as to favor the production of nickel hydroxide.

Generally speaking the end use of the hydroxide product would dictate the set of operating conditions. For example, the production of a high density hydroxide for a general use would require operating at a high temperature, while the hydroxide destined for the batteries could be made at lower temperature, say below 60° C.

Controlling the pH, or ammonia balance in the circuit, can also be done differently then described in the above example. For example, the required quantity of nitric acid can be added to the feed solution and the ammonia can be removed from the reactors (by a partial condensation) at an appropriate rate to maintain the desired pH in the reactors.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A process for directly producing nickel hydroxide comprising: (1) reacting an aqueous solution containing nickel powder and nitrate ions at about atmospheric pressure and within a temperature range of about room temperature to about 95° C. to generate nickel hydroxide, the aqueous solution having a pH equal to or in excess of about 8.5, (2) consuming the nitrate ions, and (3) separating the resultant nickel hydroxide from the solution.

2. The process according to claim 1 wherein at least one of the group consisting of nitric acid, ammonium nitrate and nickel nitrate is introduced into the aqueous solution.

3. The process according to claim 2 wherein ammonia is added to the group to maintain the pH of the solution in a range from about 8.5 to 10.

4. The process according to claim 1 wherein ammonia and water are removed from the solution.

5. The process according to claim 1 wherein the particulate nickel was formed as a result of thermal decomposition of nickel carbonyl.

6. The process according to claim 1 wherein ions selected from the group consisting of cobalt, cadmium, zinc, iron, lithium and barium are introduced into the solution.

7. A method for producing nickel hydroxide, the method comprising:
   a. forming an aqueous solution containing nitrate, ions nickel powder and water;
   b. maintaining the reaction solution at about atmospheric pressure and in a pH range equal to or in excess of about 8.5;
   c. regulating the temperature of the reaction solution in the range of about room temperature to about 95;
   d. producing nickel hydroxide and removing the nickel hydroxide from the reaction solution to form a feed solution;
   e. drying the nickel hydroxide; and
   f. introducing the feed solution into the reaction solution.

8. The method according to claim 7 wherein at least one of the group consisting of nitric acid, ammonium nitrate and nickel nitrate is introduced into the reaction solution.

9. The method according to claim 8 wherein ammonia is added to the group to adjust the pH to be in a range from about 8.5 to 10.

10. The method according to claim 7 wherein ammonia and water are removed from the feed solution.

11. The method according to claim 7 wherein the nickel concentration of the reaction solution ranges up to about 30% by mass.

12. The method according to claim 7 wherein materials selected from the group consisting of cobalt, cadmium, zinc, iron, lithium and barium are added to the reaction solution.

13. The method according to claim 7 wherein the reaction is run until the tapped density of the nickel hydroxide is at least about 2.1 grams/cm$^3$.

14. The method according to claim 7 wherein nitric acid is added to the reaction solution.

* * * * *